United States Patent [19]

Butler, Jr.

[11] Patent Number: 5,077,640

[45] Date of Patent: Dec. 31, 1991

[54] PHOTOGRAPHIC LIGHTING APPARATUS

[76] Inventor: C. Tyler Butler, Jr., 2135-L Defoor Hills Rd., NW., Atlanta, Ga. 30318

[21] Appl. No.: 566,613

[22] Filed: Aug. 13, 1990

[51] Int. Cl.$^5$ .............................................. G03B 15/02
[52] U.S. Cl. ....................................... 362/11; 362/18; 362/252; 362/391; 354/290; 354/292
[58] Field of Search .................... 362/3, 11, 12, 16-18, 362/252, 269, 250, 251, 246, 804, 808, 271, 275, 391, 249, 319, 320, 356; 354/290, 291, 292

[56] References Cited

U.S. PATENT DOCUMENTS

| | | | |
|---|---|---|---|
| 1,632,606 | 6/1927 | King | 362/11 |
| 1,890,053 | 12/1932 | Grot | 354/291 |
| 3,495,516 | 2/1970 | Henderson | 354/290 |
| 3,604,913 | 9/1971 | Crete | 362/319 |
| 3,952,322 | 4/1976 | Wolfe | 362/11 |
| 4,292,662 | 9/1981 | Gasperini | 362/17 |
| 4,475,146 | 10/1984 | Wally, Jr. | 362/11 |
| 4,855,874 | 8/1989 | Waltz | 362/16 |
| 4,872,031 | 10/1989 | Baliozian | 354/291 |

FOREIGN PATENT DOCUMENTS 0225105  6/1987  European Pat. Off. ............ 354/290

Primary Examiner—Ira S. Lazarus
Assistant Examiner—D. M. Cox
Attorney, Agent, or Firm—James B. Middleton

[57] ABSTRACT

A lighting environment for photography provides light completely around an object to be photographed. A circular diffusing screen forms the inner wall of a light box, and lights are mounted in the light box to illuminate the diffusing screen. The lights are variable in intensity so the light level around the diffusing screen can be varied. The light box is carried on cables that are individually adjustable so the height and the attitude of the light box can be varied.

14 Claims, 2 Drawing Sheets

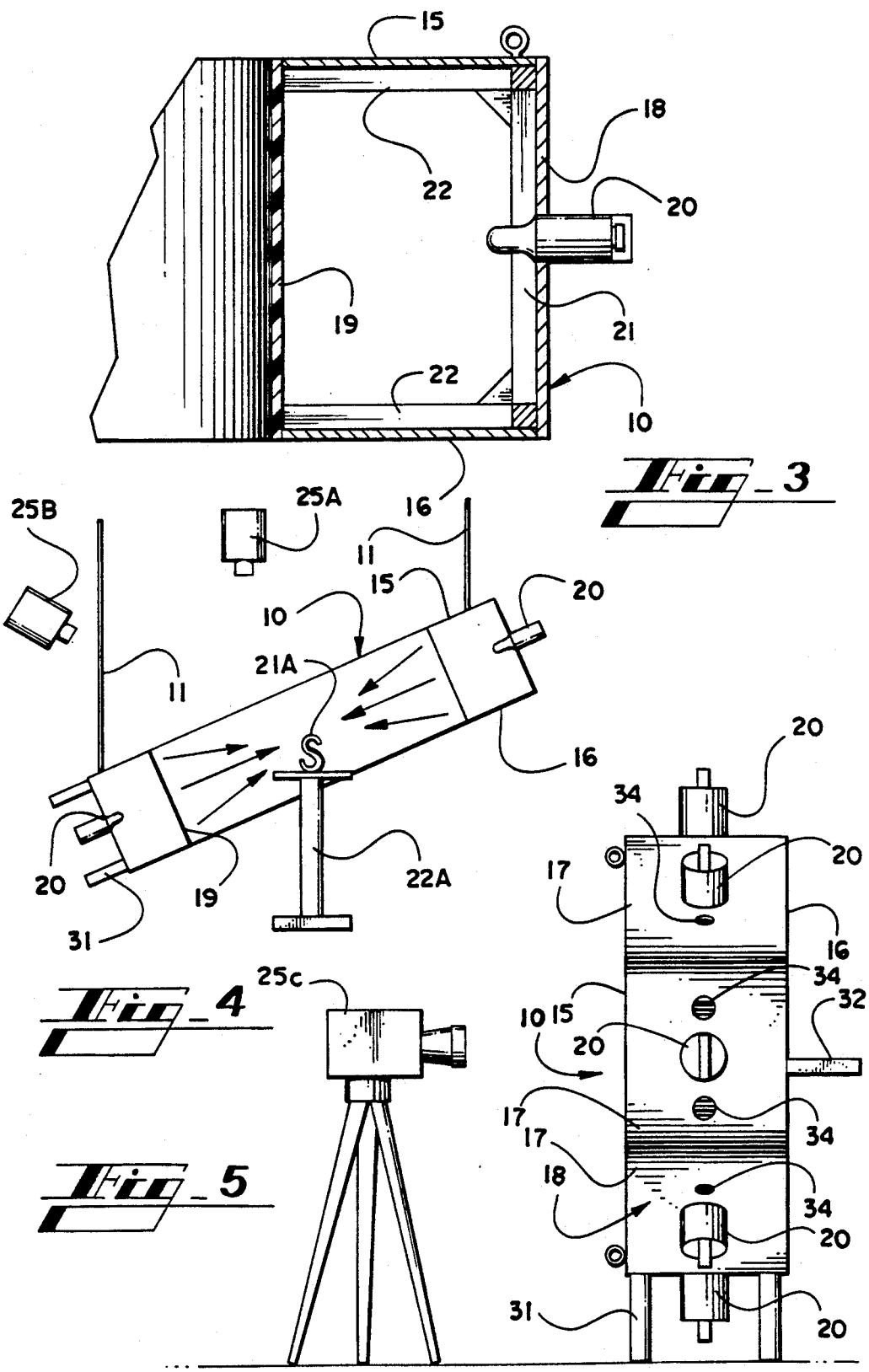

PHOTOGRAPHIC LIGHTING APPARATUS

INFORMATION DISCLOSURE STATEMENT

It is often necessary to set up a display on a table top and to photograph the display. Such table top photographs are very frequently used for advertisements, and are quite often used as magazine illustrations, and rather frequently simply as photographic artwork. The usual techniques for lighting a table top set up include the use of large reflectors of canvas or the like having a light source within the reflector. Also, umbrellas are used, a light source being directed into the umbrella so the umbrella reflects and disperses the light. Various reflective boards are also used to fill in, or accentuate, areas with diffuse light.

Diffusive and reflective type lighting devices are important in table top photographs in order to diffuse the light and prevent flare. Flare reduces color saturation in the photograph, reduces sharpness, and reduces contrast of light-to-dark tonal values. As a result, the diffuse lighting apparatus is utilized even though a considerable amount of set up time is required for a photograph. It must be realized that each individual reflector, umbrella and the like must be positioned, and adjusted as one looks through the camera viewfinder to be sure the lighting is as desired, with the uniformity desired, with or without the shadows as desired, or with the subtle lighting variations desired.

One prior art effort at providing the desired lighting for table top photography is shown in U.S. Pat. No. 4,292,662 issued to Gasperini. This device has light sources on three sides of a box, and a diffusing screen extending arcuately across the box. The Gasperini device has the disadvantages that the light can be directed from three sides, and perhaps four if the device is placed over a light source. The lighted space is small and confined so that the directions of the light sources are not variable; and, there is little choice as to camera angle when using the Gasperini device.

SUMMARY OF THE INVENTION

This invention relates generally to photographic lighting and is more particularly concerned with a lighting environment for the photographic subject.

The present invention provides a continuous diffusing screen completely surrounding a subject to be lighted, the diffusing screen being in the form of a smooth curve, for example an ellipse or a circle. A plurality of light sources is mounted behind the diffusing screen, the light sources preferably being individually variable in intensity. Light directing means are provided so that the individual light sources yield substantially uniform illumination on the diffusing screen when the intensity of the light sources is uniform.

In the preferred embodiment of the invention, the light sources are mounted in a light box, with the diffusing screen as one side of the box. The box is then adjustable to position it as desired for the preferred lighting effect.

BRIEF DESCRIPTION OF THE DRAWINGS

These and other features and advantages of the present invention will become apparent from consideration of the following specification when taken in conjunction with the accompanying drawings in which:

FIG. 3 is an enlarged cross-sectional view taken substantially along the line 3—3 in FIG. 2;

FIG. 4 is a cross-sectional view on a reduced scale showing the lighting environment in a different attitude; and, FIG. 5 is a side elevational view showing the lighting environment in another attitude.

DETAILED DESCRIPTION OF THE EMBODIMENT

Figure 1:
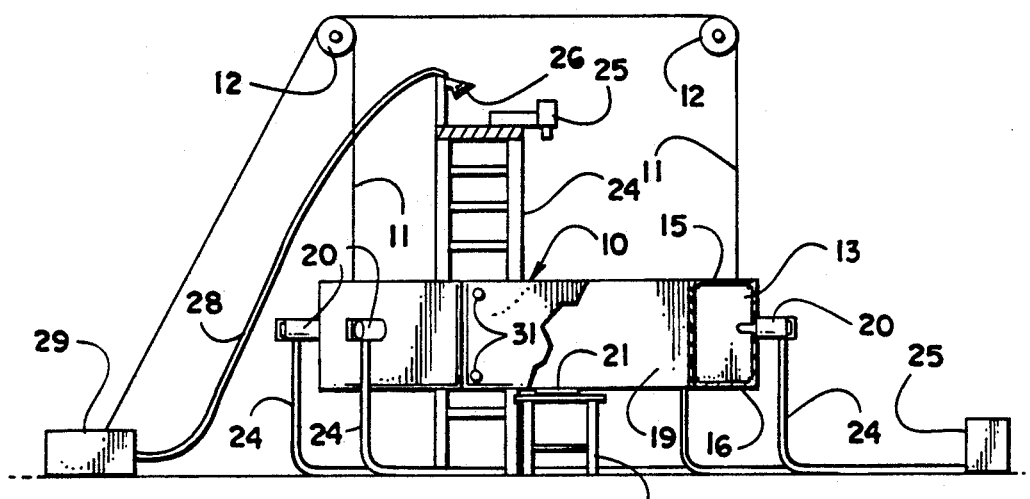
FIG. 1 is a side elevational view, partially in cross-section, showing a lighting environment made in accordance with the present invention, and illustrating one form of set-up.
Figure 2:
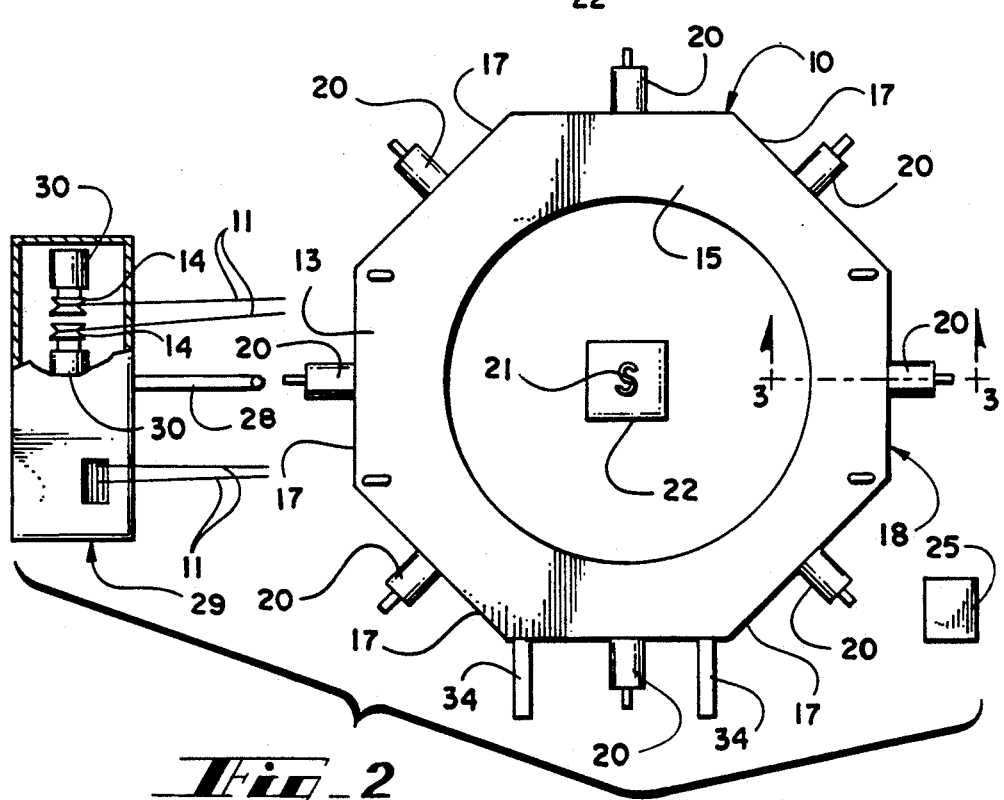
FIG. 2 is a top plan view of the apparatus illustrated in FIG. 1, some portions of the equipment being omitted for clarity.

Referring now more particularly to the drawings, and to that embodiment of the invention here chosen by way of illustration, FIGS. 1 and 2 show what might be a usual set up using the light environment of the present invention. It will be seen that the lighting environment is generally designated at 10, and is held in position by a plurality of cables 11. As is shown in FIG. 1, the cables 11 pass over pulleys 12, and are directed down to motor driven reels 14.

The lighting environment 10 includes a light box 13 having top and bottom walls 15 and 16 respectively, and an outer wall 18. The inner wall 19 comprises a cylindrical diffusing screen, which will preferably be made of a plastic material, though other materials can be substituted by those skilled in the art. As is best shown in FIG. 2, the outer wall 18 is octagonal, while the inner wall 19 is circular. Each of the facets 17 of the octagonal wall 18 carries a light source 20, here shown as electronic flash units of conventional design.

FIG. 3 shows the construction of the light box 13 formed by the walls of the lighting environment 10, and it should be noticed that the interior of the light box 13 is substantially free of obstructions. The construction here illustrated includes framing 21 for the individual facets 17 of the octagon, and generally radial pieces 22 for supporting the top and bottom walls 15 and 16. These pieces are well fixed together, using angled corner pieces as required, so the interior of the light box 13 is free of braces, trusses and the like.

The purpose of the construction shown is to allow light to be reflected around inside the light box 13 to illuminate the diffusing screen 19. Any trusses or the like may cast a shadow on the screen 19 and vary the light output. With attention to FIG. 2 of the drawings, however, it will be realized that each of the light sources 20 will directly illuminate a segment of the screen 19; and, the light from each light source 20 will be directed laterally of the light source 20 to be reflected from the adjacent facets 17 of the octagonal wall 18. The overlapping light patterns produced by the plurality of light sources 20 will yield uniform illumination on the screen 19.

With the above description in mind, the use of the light environment as illustrated in FIG. 1 should be understood. As shown in FIG. 1, the environment 10 is generally horizontally disposed, held by the cables 11. An object 21 to be photographed is supported on a table 22 centrally of the circular inner wall 19. A light source 20 is mounted in each of the facets 17 of the outer wall 18, each light source 20 being individually controllable as is known in the art. As here shown, there is a cord 24 connecting each of the light sources 20 to the control box 25.

It will therefore be recognized that the inner wall 19 will be substantially uniformly illuminated, and diffuse light will radiate therefrom. If certain sides of the object 21 need to be lighted to a less extent than other sides, certain ones of the light sources 20 will be adjusted to have a lower light output. Regardless of the specific light levels chosen, it will be seen that diffuse light will hit the object 21 from all directions so the entire object 21 will be fully lighted. It will also be noted that the object 21 is physically at about the bottom edge of the light environment 10. With this disposition, light will actually come from slightly above the object 21, however, this feature is adjustable in that the cables 11 can raise or lower the light environment 10 with respect to the object 21. It will also be obvious that a taller or shorter table 22 can be used to change the placement of the object 21.

In using a set up as shown in FIG. 1, it is contemplated that the camera will point down to photograph the object 21. Thus, FIG. 1 shows a scaffolding for supporting a camera 25 above the light environment 10. The particular form of scaffold 24 forms no part of the present invention, and any desired arrangement can be used. FIG. 1 shows simply a platform supported on appropriate legs, the platform being constructed at the desired height. It will also be readily recognized that one could use a cantilevered platform, and the platform can be adjustable in height by hydraulic means or the like.

When using the light environment of the present invention, a photographer will generally wish to view the object 21 through the camera viewer, and make adjustments to achieve the desired effect. Thus, there is a control panel 26 connected by a cable 28 to the box 29 which houses the take-up reels 14. The control panel 26 has a plurality of switches for controlling the motors 30 to raise or lower the light environment 10. Since each cable 11 is attached to a separate take-up reel 14, driven by a separate motor 30, it will be understood that the light environment 10 can be raised and lowered, and can be placed in any desired attitude.

As here shown, there are four cables 11 so that two adjacent cables can be pulled up and the light environment 10 will pivot about the other two cables. If more complex motions are desired, any one cable can be taken up to cause a tilting of the light environment 10 in the desired direction, and slack cables can be subsequently taken up to remove the slack.

While four cables render most motions quite easy to accomplish, it will be understood that a different number of cables can be utilized if desired. Three cables will be the minimum since stability is required, but three or more cables can be used depending on individual preferences.

FIG. 4 of the drawings illustrates a set-up in which the light environment 10 is tilted somewhat. In FIG. 4, the object 21A to be photographed is supported on a table 22A. Due to the shape of the object 21A, it is desired to have some light from below the object and some light from above the object. As a result, the light environment 10 is tilted so that a portion of the interior wall 19 is above the object 21A, and a portion of the wall 19 is below the object 21A. In FIG. 4, two different cameras are shown, the cameras being indicated at 25A and 25B. Since the light environment 10 is tilted, it is possible that the camera 25B could be mounted on a tripod or the like supported from the floor rather than from a scaffolding such as the scaffold 24. Alternatively, the camera 25A would be supported from a scaffold 24 or from a comparable arrangement.

FIG. 5 of the drawings shows the light environment 10 tilted all the way to a vertical position, and it should be noted that there are legs 31 extending from one facet 17 of the outer wall 18. The legs 31 are sufficient to support the entire light environment 10, and the legs 31 are long enough to provide space for the lighting means 20. Otherwise, the light environment 10 is used as discussed above.

In FIG. 5 of the drawings, the object to be photographed will be supported by the cantilevered platform 32, and the camera 25C will preferably be supported from the floor, as by a tripod or the like. With this arrangement, the light will be directed towards the object in a complete circle, including above and below rather than on all sides. The platform 32 will tend to cast a shadow on the object to be photographed, but of course the platform 32 may be made of transparent material if desired, or light ratios underneath the platform 32 can be reduced in intensity.

It will therefore be understood that the present invention provides a light environment for providing diffuse light completely surrounding a subject to be photographed. It has been found that the use of the light environment of the present invention lights an object so that more detail is seen than one normally sees in the real world, thereby giving the object an unusual appearance. This unusual appearance does not distort the object, but rather brings out all of the details, and brings them out very sharply. There are virtually no shadows which tend to soften things, and the vivid lighting sharply defines every edge of an object. With the variation in lighting available, one can of course reduce the light to a lower level when desired, or reduce light in a particular area of the light environment 10 if desired. Conventional lighting sources are variable within a reasonably wide range, but of course the lighting sources can be completely turned off at one or more facets 17 of the device 10 to achieve an even lower lighting level when desired.

While the light environment 10 here illustrated and described has eight facets 17, it will be understood that other shapes can be utilized if desired. At least three walls will be required to illuminate the inner wall 19 completely, but virtually any number from three up will operate satisfactorily. The outer wall 18 might even be circular, with light sources 20 evenly spaced therearound as desired.

The light sources 20 here illustrated are well known in the art, and are stroboscopic lights that include a blower for cooling the light. When the light sources 20 are mounted as shown, the blowers will discharge to the inside of the light box 13. As a result, there must be vent holes for the air to exit. Vent holes are illustrated in FIGS. 1 and 5 of the drawings, where it will be seen that there is a circular vent 34 on each side of each light source 20. As here shown, there is a grill covering the vent to protect the interior of the device and to prevent some light loss. Those skilled in the art will also realize that the grill can be used to deflect the air away from the light source 20 for more efficient cooling.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A light environment for photographic lighting, said light environment comprising a generally cylindrical light diffusing screen completely surrounding an object to be photographed, said light diffusing screen being in the form of a smooth curve throughout the length of said diffusing screen, a light box generally coextensive with said diffusing screen, and a plurality of light sources carried by said light box for providing light to the interior of said light box, means for adjustably supporting said light box, and control means for controlling the light output of said plurality of light sources.

2. A light environment as claimed in claim 1, said light box having an inner surface in a generally circular form, said inner surface comprising said light diffusing screen, and an outer surface in a polygonal form defining a plurality of facets, each light source of said plurality of light sources being carried by one facet of said plurality of facets.

3. A light environment as claimed in claim 2, said light box having a substantially unobstructed interior for facilitating light reflection within said light box to achieve generally uniform lighting of said diffusing screen.

4. A light environment as claimed in claim 3, said means for adjustably supporting said light box including a plurality of cables fixed to said light box, a plurality of take up reels, each take up reel receiving one cable of said plurality of cables, the arrangement being such that said take up reels can take up and release said cables to vary the position and attitude of said light box and said diffusing screen.

5. A light environment as claimed in claim 4, said plurality of cables comprising at least three cables.

6. A lighting set up for photography wherein a thing to be photographed is supported on a platform, said lighting set up including a generally cylindrical diffusing screen surrounding the thing to be photographed, means for lighting said diffusing screen so that light is propagated from said diffusing screen, and means for supporting a camera adjacent to the thing to be photographed, and further including a light box, said diffusing screen constituting the inner wall of said light box, said light box including an outer wall, a plurality of light sources carried by said outer wall and constituting said means for lighting said diffusing screen.

7. A lighting set up for photography as claimed in claim 6, the interior of said light box being substantially unobstructed for preventing shadows on said diffusing screen.

8. A lighting set up for photography as claimed in claim 7, and further including means for adjustably supporting said light box for varying the position of said light box.

9. A lighting set up for photography as claimed in claim 8, said means for adjustably supporting said light box including a plurality of cables attached to said light box, and reel means for individually taking up and releasing said plurality of cables for adjusting the height and the attitude of said light box.

10. A lighting set up for photography as claimed in claim 9, and further including a control box for controlling said reel means, said control box being selectively locatable at said means for supporting a camera.

11. A lighting set up for photography as claimed in claim 10, said means for supporting a camera comprising scaffold means above the thing to be photographed.

12. A lighting set up for photography as claimed in claim 10, said means for supporting a camera comprising a tripod adjacent to said light box.

13. A lighting set up for photography as claimed in claim 6, and further including means for varying the intensity of each light source of said plurality of light sources.

14. A lighting set up for photography as claimed in claim 13, said outer wall defining a plurality of contiguous facets, each light source of said plurality of light sources being carried by one facet of said plurality of facets.

* * * * *